United States Patent
Di Palma et al.

(10) Patent No.: US 10,473,776 B2
(45) Date of Patent: Nov. 12, 2019

(54) TRANSMIT-ARRAY ANTENNA FOR A MONOPULSE RADAR SYSTEM

(71) Applicant: Commissariat à l'Energie Atomique et aux Energies Alternatives, Paris (FR)

(72) Inventors: Luca Di Palma, Grenoble (FR); Antonio Clemente, Seyssins (FR); Laurent Dussopt, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 352 days.

(21) Appl. No.: 15/331,001

(22) Filed: Oct. 21, 2016

(65) Prior Publication Data

US 2017/0115385 A1  Apr. 27, 2017

(30) Foreign Application Priority Data

Oct. 23, 2015  (FR) ...................................... 15 60157

(51) Int. Cl.
*G01S 13/44*  (2006.01)
*H01Q 5/55*  (2015.01)
(Continued)

(52) U.S. Cl.
CPC ........... *G01S 13/4463* (2013.01); *H01Q 3/36* (2013.01); *H01Q 3/46* (2013.01); *H01Q 5/55* (2015.01);
(Continued)

(58) Field of Classification Search
CPC ....... G01S 2007/403; G01S 2007/4034; G01S 13/4463; G01S 13/44; G01S 2007/4065;
(Continued)

(56) References Cited

U.S. PATENT DOCUMENTS 5,027,125 A * 6/1991 Tang ........................ H01Q 3/24
342/368
5,223,850 A 6/1993 Branigan et al.
(Continued)

FOREIGN PATENT DOCUMENTS

FR  1244969 A  11/1960

OTHER PUBLICATIONS

Preliminary Search Report in French Patent Application No. 1560157, dated Aug. 31, 2016, 2 pages.
(Continued)

*Primary Examiner* — Olumide Ajibade Akonai
(74) *Attorney, Agent, or Firm* — Moreno IP Law LLC

(57) ABSTRACT

An antenna including: an array of individually-controllable elementary cells, each cell being capable of transmitting a radio signal by introducing into the signal a controllable phase shift selected from among at least two discrete phase-shift values; on the side of a first surface of the array, first, second, third, and fourth primary sources capable of respectively irradiating first, second, third, and fourth consecutive quadrants of the array; and a processing circuit capable of supplying a first signal representative of the sum of the signals S1, S2, S3, and S4 supplied, respectively, by the first, second, third, and fourth sources, a second output signal representative of difference S1+S2−S3−S4, and a third output signal representative of difference S1−S2−S3+S4.

12 Claims, 4 Drawing Sheets

(51) Int. Cl.
  *H01Q 3/36* (2006.01)
  *H01Q 3/46* (2006.01)
  *G01S 13/02* (2006.01)
  *H01Q 3/26* (2006.01)
  *H01Q 15/02* (2006.01)
(52) U.S. Cl.
  CPC .... *G01S 2013/0254* (2013.01); *H01Q 3/2617* (2013.01); *H01Q 15/02* (2013.01)
(58) Field of Classification Search
  CPC ......... G01S 13/9023; G01S 2013/0254; G01S 13/4436; G01S 13/4454; G01S 13/4472; G01S 13/685; H01Q 25/02; H01Q 3/26; H01Q 21/065; H01Q 3/36; H01Q 21/064; H04B 7/0842
  See application file for complete search history.

(56) References Cited

U.S. PATENT DOCUMENTS

| | | | |
|---|---|---|---|
| 5,612,702 A | 3/1997 | Kinsey | |
| 6,320,541 B1* | 11/2001 | Pozgay | G01S 13/44 342/149 |
| 6,456,238 B1* | 9/2002 | Posey | G01S 13/44 342/149 |
| 2003/0020646 A1* | 1/2003 | Yu | G01S 13/4409 342/17 |
| 2006/0284768 A1* | 12/2006 | Pauplis | H01Q 3/267 342/368 |
| 2009/0102716 A1* | 4/2009 | Sego | G01S 7/003 342/377 |
| 2010/0117893 A1* | 5/2010 | Dreher | B64G 1/66 342/352 |
| 2011/0140953 A1* | 6/2011 | Lynam | G01S 13/4409 342/153 |

OTHER PUBLICATIONS

Cheng, Yu Jian et al.; 94 GHz Substrate Integrated Monopulse Antenna Array; IEEE Transactions on Antennas and Propagation; vol. 60, No. 1; Jan. 2012.

Clemente, Antonio et al.; Focal Distance Reduction of Transmit-Array Antennas Using Multiple Feeds; IEEE Antennas and Wireless Propagation Letters; vol. 11; 2012.

Clemente, Antonio et al.; 1-Bit Reconfigurable Unit Cell Based on PIN Diodes for Transmit-Array Applications in X-Band; IEEE Transactions on Antennas and Propagation, vol. 60, No. 5; May 2012.

Di Palma, Luca et al.; Radiation Pattern Synthesis for Monopulse Radar Applications using a Reconfigurable Transmitarray in X-Band; 2015 9th European Conference on Antennas and Propagation (EuCAP), Apr. 13-17, 2015.

Hu, W. et al.; Liquid-crystal-based reflectarray antenna with electronically switchable monopulse patterns; Electronics Letters; vol. 43, No. 14; Jul. 5, 2007.

Kinsey, Richard R.; An Edge-Slotted Waveguide Array with Dual-Plane Monopulse; IEEE Transactions on Antennas and Propagation; vol. 47, No. 3; Mar. 1999.

Liu, Bing et al.; Substrate Integrated Waveguide (SIW) Monopulse Slot Antenna Array; IEEE Transactions on Antennas and Propagation; vol. 57, No. 1; Jan. 2009.

Lopez, Alfred R.; Monopulse Networks for Series Feeding an Array Antenna; IEEE Transactions on Antennas and Propagation; vol. AP-16, No. 4; Jul. 1968.

Raman, Sanjay et al.; A W-Band Dielectric-Lens-Based Integrated Monopulse Radar Receiver; IEEE Transactions on Microwave Theory and Techniques; vol. 46, No. 12; Dec. 1998.

Schulwitz, Lora et al.; A Monopulse Rotman Lens Phased Array for Enhanced Angular Resolution; IEEE; 2007.

Wang, Hao et al.; A Compact Single Layer Monopulse Microstrip Antenna Array; IEEE Transactions on Antennas and Propagation; vol. 54, No. 2; Feb. 2006.

Wang, H. et al.; A Single-Channel Microstrip Electronic Tracking Antenna Array With Time Sequence Phase Weighting on Sub-Array; IEEE Transactions on Microwave Theory and Techniques; vol. 58, No. 2; Feb. 2010.

Yu, Zhong-Wu, et al.; A Broadband Planar Monopulse Antenna Array of C-Band; IEEE Antennas and Wireless Propagation Letters; vol. 8; 2009.

Clemente, Antonio et al.; Wideband 400-Element Electronically Reconfigurable Transmitarray in X Band; IEEE Transactions on Antennas and Propagation; vol. 61, No. 10; Oct. 2013.

* cited by examiner

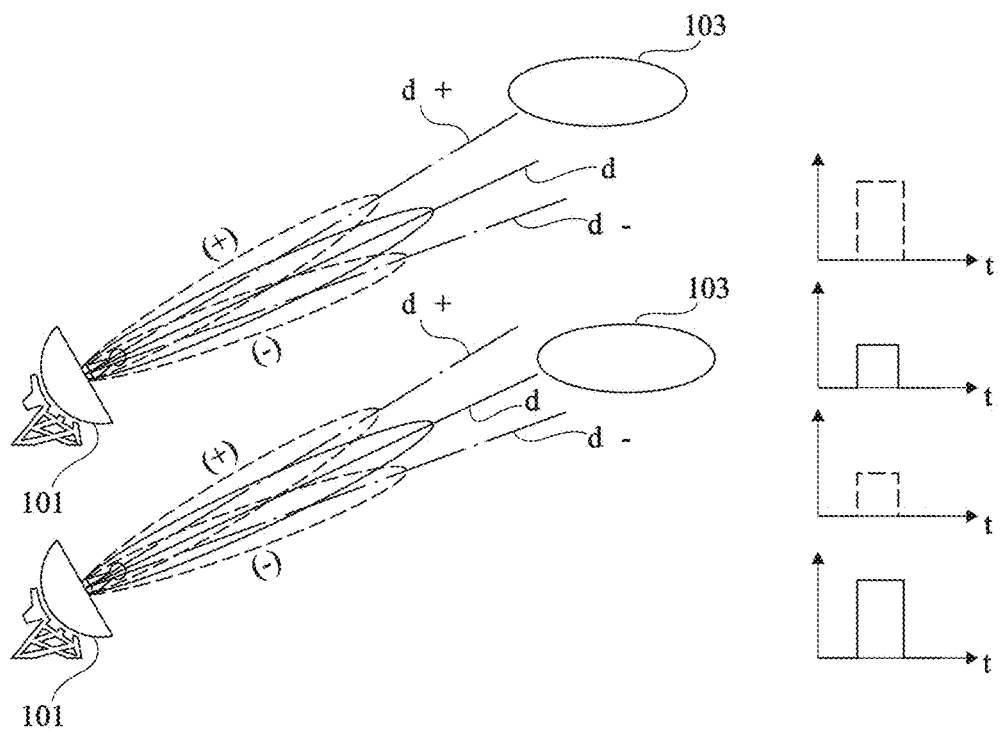
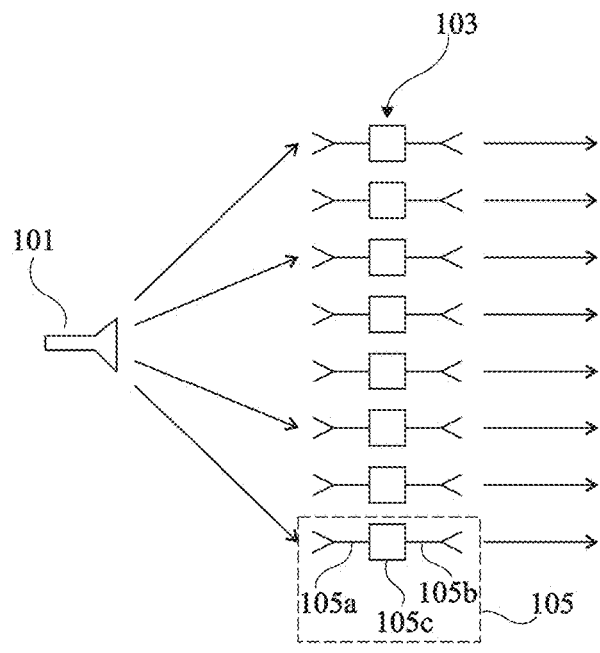
Fig 1
Fig 2

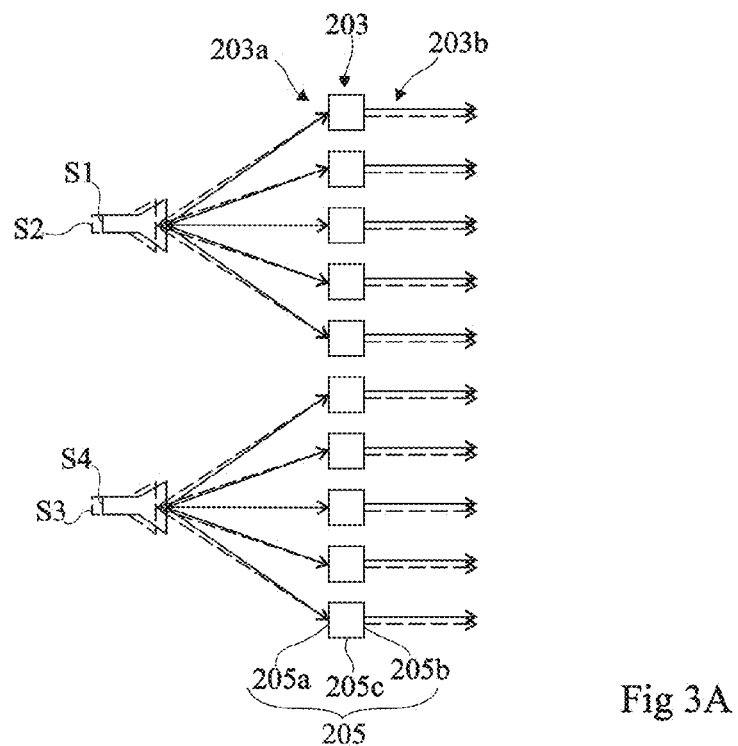
Fig 3A
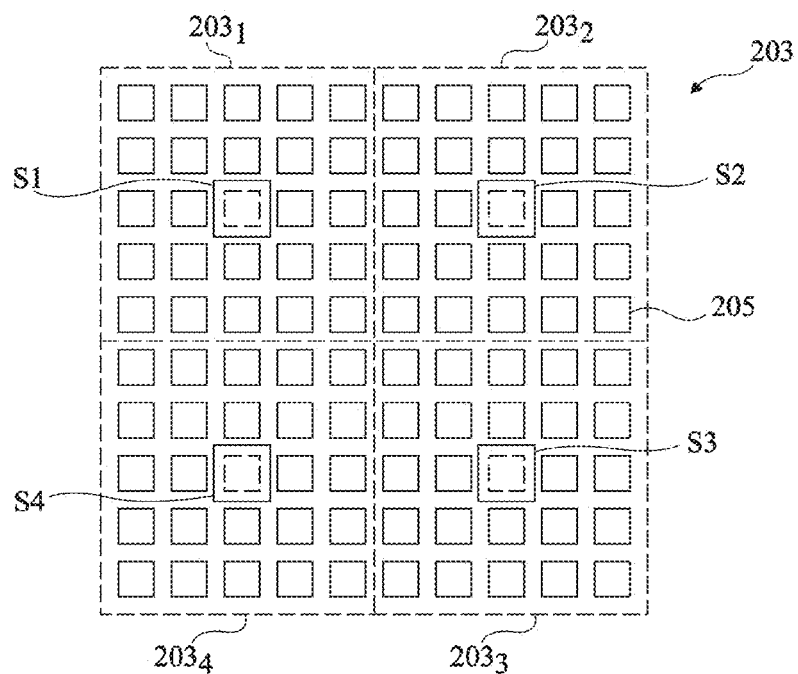
Fig 3B
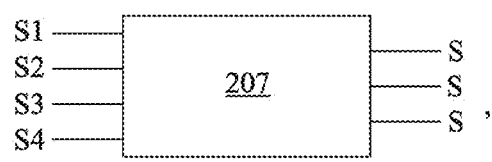

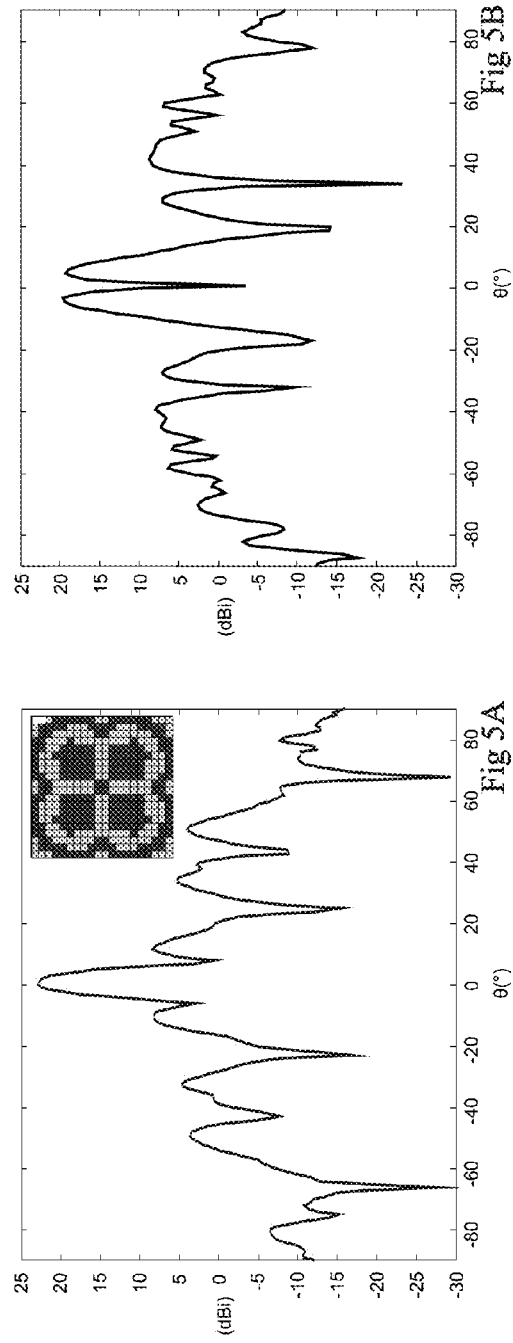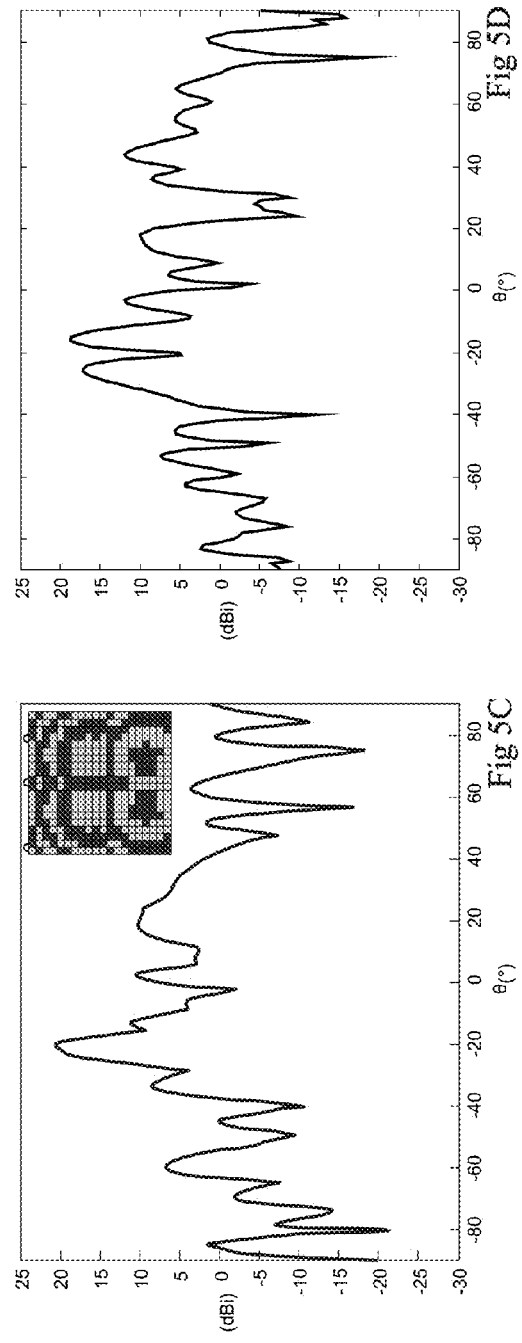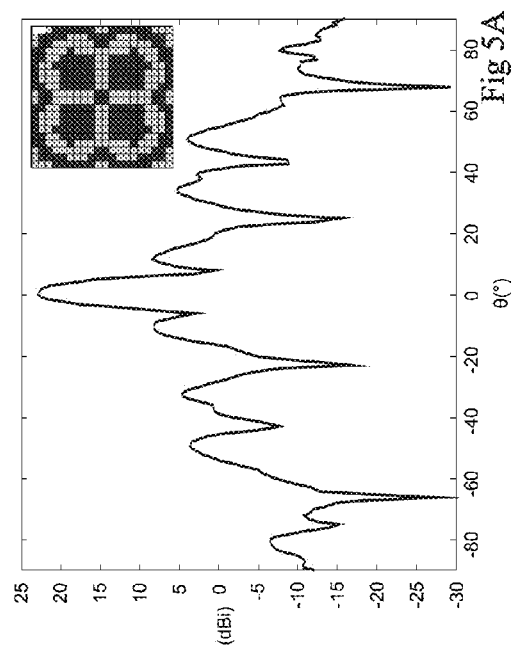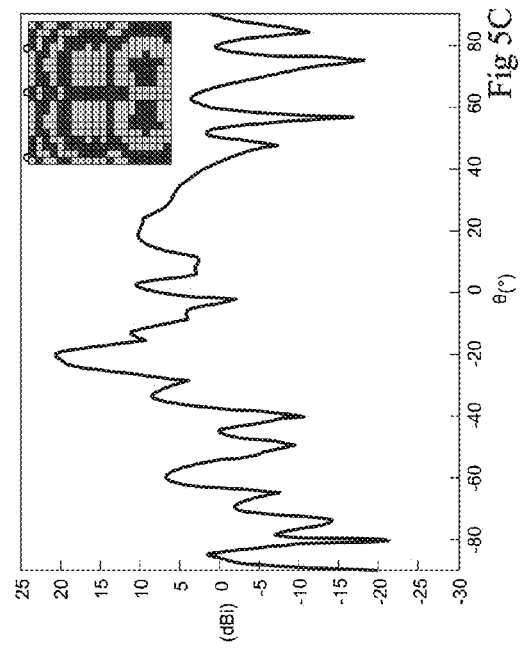

TRANSMIT-ARRAY ANTENNA FOR A MONOPULSE RADAR SYSTEM

CROSS-REFERENCE TO RELATED APPLICATION

This application claims the priority benefit of French patent application number 15/60157, the content of which is hereby incorporated by reference in its entirety to the maximum extent allowable by law.

BACKGROUND

The present disclosure relates to the field of transmit-array antennas, and more particularly to a transmit-array antenna adapted to a monopulse radar system.

DISCUSSION OF THE RELATED ART

FIG. 1 schematically illustrates the operating principle of a monopulse radar system. Such a system conventionally comprises an antenna 101 capable of transmitting and of receiving radio waves, for example, waves at a frequency in the range from 1 to 100 GHz. More particularly, antenna 101 is capable of generating two different beams:

a first beam Σ, generally called sum beam, having the most part of its power concentrated in a single main lobe centered along a first direction dΣ; and a second beam Δ, generally called difference beam, having the most part of its power distributed in two main different lobes Δ(+) and Δ(−), respectively centered along second and third directions dΔ+ and dΔ−, directions dΔ+, dΔ−, and dΣ being coplanar, directions dΔ+ and dΔ− being substantially symmetrical with respect to direction dΣ, and second beam Δ having a zero or negligible power (for example, at least 100 times smaller than that of beam Σ) in direction dΣ.

During a transmit phase, antenna 101 is configured to only transmit sum beam Σ, in the form of a single pulse. During a receive phase subsequent to the transmit phase, antenna 101 is configured to simultaneously receive sum beam Σ and difference beam Δ, and to supply signals representative of the two beams on two different output paths or terminals. When a target object 103 is on the path of the pulse transmitted by antenna 101, an echo is sent back towards antenna 101. If object 103 is located on central direction dΣ of the antenna or close to central direction dΣ, which corresponds to the situation shown in the lower portion of FIG. 1, the portion of the echo signal captured in sum beam Σ is preponderating over the portion of the echo signal captured in difference beam Δ. If, however, object 103 is located on one of directions dΔ+ and dΔ− of the difference beam or close to one of directions dΔ+ and dΔ− of the difference beam, which corresponds to the situation shown in the upper portion of FIG. 1, the portion of the echo signal captured in difference beam Δ is preponderating over the portion of the echo signal captured in sum beam Σ. Thus, the comparison of the output signals of antenna 101 associated with the two beams Σ and Δ provides information representative of the alignment error between the central transmit direction dΣ or pointing direction of the antenna and the position of object 103. The alignment error of the antenna is then corrected, after which a new pulse of sum beam Σ is transmitted. An automatic tracking of the position of object 103 in the plane comprising directions dΔ+, dΔ− and dΣ can thus be achieved. To track the position of an object in the three dimensions of space, antenna 101 may further be capable, during the receive phase, of generating, simultaneously with the first and second beams Σ and Δ, a third beam Δ' (not shown in FIG. 1), also called difference beam, having the most part of its power distributed in two different main lobes Δ'(+) and Δ'(−), respectively centered along fourth and fifth directions dΔ'+ and dΔ'−, directions dΔ'+, dΔ'−, and dΣ being coplanar, directions dΔ'+ and dΔ'− being substantially symmetrical with respect to direction dΣ, third beam Δ' having a zero or negligible power (for example, at least 100 smaller than that of beam Σ) in direction dΣ, and the plane comprising directions dΔ'+, dΔ'−, and dΣ being substantially orthogonal to the plane comprising directions dΔ+, dΔ−, and dΣ.

An advantage of monopulse radar systems is that the echo of a single pulse transmitted by antenna 101 provides information representative of the alignment error between pointing direction dΣ of the antenna and the position of target object 103. This enables to track the position of the target object more accurately and rapidly than in so-called sequential beam switching radar systems, where pulses of a single-lobe beam are successively transmitted in a plurality of directions located on either side of a central axis or pointing axis of the antenna, the alignment error between the pointing axis of the antenna and the target object being determined by comparing the echoes of the different pulses.

Many implementations of monopulse radar systems have been provided, where the simultaneous generation of sum beam Σ and of difference beams Δ, Δ' is performed by an antenna element having a fixed radiation diagram, a motor-driven mechanical system being used to control the pointing direction of the antenna to enable to track the target object.

To improve the detection performance and the position tracking, and to decrease the mechanical complexity of the system, it would however be desirable to have an antenna adapted to a monopulse radar system, that is, capable of simultaneously generating sum beam Σ and difference beams Δ, Δ', the antenna being electronically controllable to modify the pointing direction of the antenna with no motor-driven mechanical element.

Antennas electronically controllable to modify the pointing direction of a beam generated by the antenna comprise reconfigurable transmit-array antennas.

FIG. 2 is a simplified side view of a transmit-array antenna. Such an antenna typically comprises one or a plurality of primary sources 101 (a single source in the shown example) irradiating a transmit array 103. Array 103 comprises a plurality of elementary cells 105, for example, arranged in a matrix of rows and columns. Each cell 105 comprises two opposite antenna surfaces 105a and 105b and is capable of receiving an electromagnetic radiation on one or the other of its surfaces 105a and 105b and of retransmitting this radiation from its opposite surface 105b or 105a with a known phase shift φ). To achieve this, surfaces 105a and 105b of the cell are separated by a phase-shift device 105c. The characteristics of the beam generated by the antenna, and particularly its shape and its central direction (or pointing direction), depend on the values of the phase shifts introduced by the different cells. The transmit array is called reconfigurable when elementary cells 105 are individually electronically controllable to have their phase-shift value φ modified, which enables to dynamically modify the characteristics of the beam generated by the antenna, and particularly to modify the pointing direction of the antenna without mechanically displacing the antenna or a portion of the antenna by means of a motor-driven element.

Configurable transmit-array antennas particularly have the advantages of having a good power efficiency, and of being relatively simple, inexpensive, and low-bulk, particularly due to the fact that the transmit arrays can be formed in planar technology, generally on a printed circuit.

An embodiment of a reconfigurable transmit-array antenna has been described in the article entitled "Wideband 400-Element Electronically Reconfigurable Transmitarray in X Band" of Antonio Clemente et al. (IEEE Trans. on Antennas and Propagation, vol. 61, No. 10, pp. 5017-5027, October 2013).

The article entitled "Radiation Pattern Synthesis for Monopulse Radar Applications using a Reconfigurable Transmitarray in X-Band" of Luca Di Palma et al. (EuCAP 2015, April 2015, Lisbon, Portugal) shows that sum or difference beams (or radiation diagrams) of the type used in monopulse radar systems may be generated by means of a reconfigurable transmit-array antenna. This article however remains theoretical since it does not describe how to simultaneously generate the sum and difference beams by means of a transmit-array antenna, which is a necessary condition for the implementation of a monopulse radar system.

An object of an embodiment is to provide a reconfigurable transmit-array antenna adapted to a monopulse radar system.

SUMMARY

Thus, an embodiment provides an antenna comprising: an array of individually-controllable elementary cells, each cell being capable of transmitting a radio signal by introducing into the signal a controllable phase shift selected from among at least two discrete phase-shift values; on the side of a first surface of the array, first, second, third, and fourth primary sources capable of respectively irradiating first, second, third, and fourth consecutive quadrants of the array; and a processing circuit capable of supplying a first signal representative of the sum of the signals S1, S2, S3, and S4 supplied, respectively, by the first, second, third, and fourth sources, a second output signal representative of difference S1+S2−S3−S4, and a third output signal representative of difference S1−S2−S3+S4.

According to an embodiment, the elementary cells of the array are arranged in a matrix of rows and columns.

According to an embodiment, the matrix of elementary cells of the array is a square matrix.

According to an embodiment, the array comprises from 100 to 10,000 elementary cells.

According to an embodiment, each of the first, second, third, and fourth primary sources comprises a horn antenna.

According to an embodiment, each of the elementary cells is a 1-bit cell capable of introducing a 0 or 180° phase shift in the transmitted signal.

According to an embodiment, the processing circuit comprises first, second, third, and fourth hybrid 180° couplers, each coupler comprising first, second, third, and fourth input/output paths.

According to an embodiment: the first coupler has its second and third paths respectively connected to the second and first sources, and the second coupler has its second and third paths respectively connected to the third and fourth sources; the third coupler has its second and third paths respectively connected to the first path of the first coupler and to the first path of the second coupler; the fourth coupler has its second and third paths respectively connected to the fourth path of the first coupler and to the fourth path of the second coupler; and the first path of the third coupler is connected to a path for supplying the first output signal, the fourth path of the third coupler is connected to a path for supplying the third output signal, and the first path of the fourth coupler is connected to a path for supplying the second output signal.

According to an embodiment, each of the first, second, third, and fourth couplers is capable of: dividing a signal input on its first path into two signals of substantially equal intensities transmitted, with no phase change, to its second and third paths; adding signals received on its second and third paths and transmitting the resulting signal on its first path; and subtracting signals received on its second and first paths and transmitting the resulting signal on its fourth path.

Another embodiment provides a monopulse radar system comprising an antenna of the above-mentioned type.

The foregoing and other features and advantages will be discussed in detail in the following non-limiting description of dedicated embodiments in connection with the accompanying drawings.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIG. 1, previously described, schematically illustrates the operating principle of a monopulse radar;

FIG. 2, previously described, is a simplified side view of a transmit-array antenna;

FIGS. 3A and 3B are respectively a simplified side view and a simplified rear view (that is, a view of the back side) of an embodiment of a reconfigurable transmit-array antenna adapted to a monopulse radar system;

FIGS. 5A, 5B, 5C, 5D are diagrams illustrating the behavior of an antenna of the type described in relation with FIGS. 3A, 3B, and 4.

DETAILED DESCRIPTION OF THE PRESENT EMBODIMENTS

Figure 4:
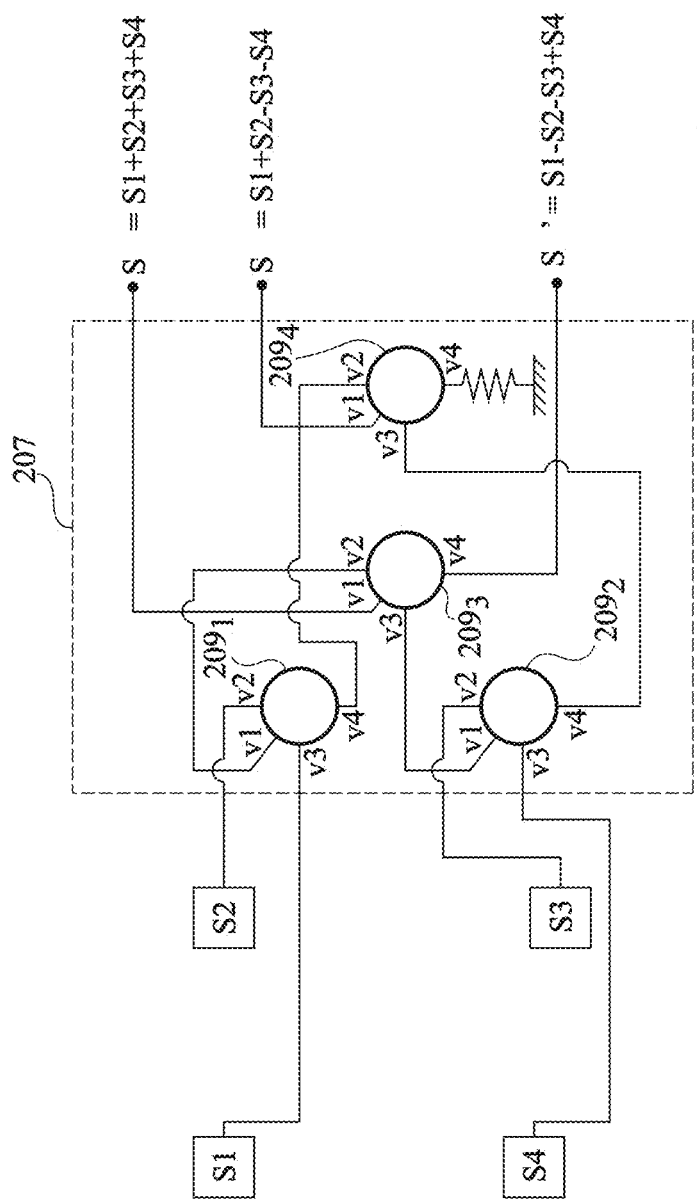
FIG. 4 shows in further detail an embodiment of a processing circuit of the antenna of FIGS. 3A and 3B.

The same elements have been designated with the same reference numerals in the different drawings and, further, the various drawings are not to scale. For clarity, only those elements which are useful to the understanding of the described embodiments have been shown and are detailed. In particular, embodiments of a transmit-array antenna comprising a transmit array and a plurality of primary sources arranged to irradiate this array will be described hereafter. The structure and the operation of the transmit array and of the elementary cells forming the array and the structure and the manufacturing of the primary sources will not be described in detailed fashion, the described embodiments being compatible with all or most of known structures of transmit arrays and of primary radiation sources.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings, it being understood that, in practice, the described elements may be oriented differently. Unless otherwise specified, expressions "approximately", "about", "substantially", and "in the order of" mean to within 10%, preferably to within 5%.

FIGS. 3A and 3B respectively are a cross-section view and a rear view of a reconfigurable transmit-array antenna adapted to a monopulse radar system.

The antenna comprises a reconfigurable transmit array 203 comprising a plurality of elementary cells 205, for example, from 100 to 10,000 elementary cells. In the shown example, elementary cells 205 are arranged in a square matrix. The described embodiments are however not limited to this specific case. As a variation, elementary cells 205 may be arranged in a rectangular matrix, or be arranged in rows and in columns in a space of generally circular, elliptic, rectangular, or other shape, or be distributed in a non-regular or non-periodic layout in a space of generally circular, elliptic, rectangular, or other shape. Each cell 205 comprises two opposite antenna surfaces 205a and 205b and is capable of receiving an electromagnetic radiation on one or the other of its surfaces 205a and 205b and of retransmitting this radiation from its opposite surface 205b or 205a at the same frequency but with a known phase shift $\phi$). To achieve this, surfaces 205a and 205b of the cell are separated by a phase-shift device 205c. Surfaces 205a of the different cells 205 of array 203 face a first side of the array, and define a first surface 203a of the array, and surfaces 205b of the different cells 205 of array 203 face a second side of the array opposite to the first side and define a second surface 203b of the array opposite to the first surface. Elementary cells 205 are individually electronically controllable to modify value $\phi$ of the phase shift that they introduce, which enables to dynamically modify the characteristics of the beam generated by the antenna, and particularly to modify its pointing direction without mechanically displacing the antenna or a portion of the antenna by means of a motor-driven element. As an example, each cell 205 may be controlled to take one or the other of the two phase-shift values $\phi=0°$ and $\phi=180°$. It is then spoken of a 1-bit cell, since the phase shift $\phi$ introduced by the cell may be controlled with a 1-bit resolution (0° or 180° phase shift). As a variation, each cell 205 may be controlled with a resolution greater than 1 bit, that is, the value of the phase shift $\phi$ introduced by each cell may be selected from among a number of discrete values greater than 2. Elementary cells 205 of array 203 are for example all identical or similar. Each elementary cell 205 for example has dimensions in the order of half the operating wavelength of the antenna, the operating frequency of the antenna being for example in the band ranging from 1 to 100 GHz. As an example, elementary cells 205 of transmit array 203 are cells of the type described in the article entitled "1-Bit Reconfigurable Unit Cell Based on PIN Diodes for Transmit-Array Applications in X-Band", of Antonio Clemente et al. (IEEE Trans. on Antennas and Propagation, vol. 60, No. 5, pp. 2260-2269, May 2012). Transmit array 203 is for example an array of the type described in the above-mentioned article entitled "Wideband 400-Element Electronically Reconfigurable Transmitarray in X Band", of Antonio Clemente et al.

The antenna of FIGS. 3A and 3B further comprises four primary different transmit/receive sources S1, S2, S3, and S4, capable of respectively irradiating four different portions $203_1$, $203_2$, $203_3$, and $203_4$ of array 203. Sources S1, S2, S3, and S4 are arranged on the side of a same surface of the array. In the shown example, sources S1, S2, S3, and S4 are arranged opposite surface 203a of the array. Each of portions $203_1$, $203_2$, $203_3$ and $203_4$ of array 203 for example substantially corresponds to one quarter of array 203. In the shown example, portions $203_1$, $203_2$, $203_3$ and $203_4$ of array 203 respectively correspond, in the orientation of FIG. 3B, to a first quarter of array 203, located at the top left of the array with respect to the center of symmetry of the array, to a second quarter of array 203, located at the top right of the array with respect to the center of symmetry of the array, to a third quarter of array 203, located at the bottom right of the array with respect to the center of symmetry of the array, and to a fourth quarter of array 203, located at the bottom left of the array with respect to the center of symmetry of the array. In other words, portions $203_1$, $203_2$, $203_3$ and $203_4$ of array 203 substantially correspond to four consecutive quadrants of the array, a quadrant being here considered as being a 90° angular sector of surface 203a, defined from the center of symmetry of surface 203a.

In practice, the beam generated by each of sources S1, S2, S3, and S4 mainly irradiates the array portion $203_1$, $203_2$, $203_3$ or $203_4$ associated therewith, but may slightly go over the limits of the neighboring array portions. Each of sources S1, S2, S3, and S4 is for example capable of generating a beam of generally conical shape. Each of sources S1, S2, S3, and S4 for example comprises a horn antenna. As an example, the central axis of each of sources S1, S2, S3, and S4 is substantially orthogonal to the mean plane of array 203. The central axis of each of sources S1, S2, S3, and S4 for example substantially runs through the center of the array portion $203_1$, $203_2$, $203_3$ or $203_4$ associated with the source. As an example, in the plane of surface 203a of the array, the diameter of the beam generated by each of sources S1, S2, S3, and S4 substantially corresponds to the largest dimension of the array portion $203_1$, $203_2$, $203_3$ or $203_4$ associated with the source. In practice, the accurate positioning of each of sources S1, S2, S3, and S4 and the sizing of the beams transmitted by the sources may be adjusted to optimize the general radiation diagram of the antenna.

Array 203 and sources S1, S2, S3, and S4 are bidirectional elements, that is, they behave substantially in the same way in transmit and receive mode.

The operation of the antenna of FIGS. 3A and 3B will now be described. In this antenna, the functions of simultaneous generation of sum beam Σ and of difference beams Δ and Δ', and of control of the pointing direction of the antenna (that is, the direction along which sum beam Σ has a maximum intensity and along which difference beams Δ and Δ' have a minimum intensity) are implemented as follows.

The function of generation of sum beam Σ and of control of the pointing direction is carried out by transmit array 203. For this purpose, array 203 may be driven as a conventional transmit array. More particularly, array 203 is controlled to combine the four beams generated by sources S1, S2, S3, and S4 to generate sum beam Σ and, possibly, to dynamically modify central direction dΣ of sum beam Σ to perform an electronic scanning or to track the position of a target object. The methods of determining the phase-shift values $\phi$ to be applied to the different elementary cells 205 of array 203 to generate sum beam Σ along a given direction dΣ have not been detailed, since usual methods of controlling a reconfigurable transmit array may be used to perform this function.

The function of generating, simultaneously with sum beam Σ, difference beams Δ and Δ', is carried out by means of a processing circuit 207 capable of recombining the signals received by sources S1, S2, S3, and S4. For simplification, the signals supplied by sources S1, S2, S3, and S4, respectively, will be designated hereafter with the same references S1, S2, S3 and S4 as the sources themselves. More particularly, processing circuit 207 is capable of supplying:

on a first output path, a first signal SΣ representative of sum S1+S2+S3+S4 of the output signals of sources S1, S2, S3, and S4;

on a second output path, a second signal SΔ representative of combination S1+S2−S3−S4 of the output signals of sources S1, S2, S3, and S4; and on a third output path, a third signal SΔ' representative of combination S1−S2−S3+S4 of the output signals of sources S1, S2, S3, and S4.

During a transmit phase, sources S1, S2, S3, and S4 are controlled to simultaneously transmit a beam for a period of predetermined duration, so that the antenna only transmits sum beam Σ, in the form of a single pulse.

During a receive phase subsequent to the transmit phase, signals SΣ, SΔ and SΔ' supplied by processing circuit 207 are analyzed. Signal SΣ is representative of sum beam Σ. Signal SΔ is representative of a first difference beam Δ in the azimuth plane, having most of its power distributed in two different main lobes, respectively centered along directions dΔ+ and dΔ− (not shown in FIGS. 3A and 3B), directions dΔ+, dΔ− and dΣ being coplanar, directions dΔ+ and dΔ− being substantially symmetrical with respect to direction dΣ, and second beam Δ' having a zero or negligible power in direction dΣ. Signal SΔ' is representative of a second difference beam Δ' in the elevation plane, having most of its power distributed in two different main lobes, respectively centered along directions dΔ'+ and dΔ'− (not shown in FIGS. 3A and 3B), directions dΔ'+, dΔ'−, and dΣ being coplanar, directions dΔ'+ and dΔ'− being substantially symmetrical with respect to direction dΣ, third beam Δ' having a zero or negligible power in direction dΣ, and the plane containing directions dΔ'+, dΔ'−, and dΣ being substantially orthogonal to the plane containing directions dΔ+, dΔ−, and dΣ.

The comparison of output signals SΣ, SΔ and S' provides information representative of the alignment error between the central transmission direction dΣ or pointing direction of the antenna and the position of a target object sending back an echo towards the antenna, and this in the three dimensions of space.

Thus, the antenna described in relation with FIGS. 3A and 3B is adapted to a monopulse radar system, and has the advantage of being electronically controllable to modify its pointing direction with no motor-driven mechanical element.

FIG. 4 shows in further detail an embodiment of processing circuit 207 of the antenna of FIGS. 3A and 3B. In this example, circuit 207 comprises four hybrid 180-degree couplers, for example, ring couplers, respectively designated with references $209_1$, $209_2$, $209_3$, and $209_4$. Each hybrid coupler $209_1$, $209_2$, $209_3$, $209_4$ comprises four input/output paths v1, v2, v3 and v4. A signal entering through path v1 is divided into two signals of substantially equal intensities with no relative phase difference transmitted to paths v2 and v3. Path v4 receives none of this incoming signal. When signals enter through paths v2 and v3, path v1 supplies a signal equal to the sum of the signals, and path v4 supplies a signal equal to the difference of the signals. In the example of FIG. 4, coupler $209_1$ has its paths v2 and v3 respectively connected to sources S2 and S1, and couple $209_2$ has its paths v2 and v3 respectively connected to sources S3 and S4. Coupler $209_3$ has its paths v2 and v3 respectively connected to path v1 of coupler $209_1$ and to path v1 of coupler $209_2$. Coupler $209_4$ has its paths v2 and v3 respectively connected to path v4 of coupler $209_1$ and to path v4 of coupler $209_2$. Path v1 of coupler $209_3$ is connected to the path for supplying signal SΣ. Path v4 of coupler $209_3$ is connected to the path for supplying signal SΔ'. Path v1 of coupler $209_4$ is connected to the path for supplying signal SΔ. Path v4 of coupler $209_4$ is connected to ground via an end resistor.

Thus, signal SΣ is equal to sum S1+S2+S3+S4 of the output signals of sources S1, S2, S3, and S4, signal SΔ is equal to combination S1+S2−S3−S4 of the output signals of sources S1, S2, S3, and S4, and signal SΔ' is equal to combination S1−S2−S3+S4 of the output signals of sources S1, S2, S3, and S4.

During the transmit phase, the pulse to be transmitted may be applied to the node for supplying signal SΣ. Thereby, the transmitted signal is divided into four signals of substantially equal intensity, with no relative phase difference, the four signals being respectively transmitted to sources S1, S2, S3, S4.

The described embodiments are not limited to the example of processing circuit 207 described in relation with FIG. 4. More generally, any other circuit capable of performing the desired combinations may be used, for example, a RF circuit, an analog circuit, or a digital circuit. In particular, circuit 207 may comprise a conversion circuit capable of supply digital signals representative of the output signals of sources S1, S2, S3, and S4, and a calculation unit capable of performing, in the digital field, the desired combinations to obtain signals SΣ, SΔ, and SΔ'.

FIGS. 5A, 5B, 5C, 5D are diagrams illustrating the behavior of the antenna described in relation with FIGS. 3A, 3B, and 4. The diagrams of FIGS. 5A and 5B respectively show the radiation diagrams (gain dBi in ordinates according to angle θ with respect to the center of symmetry of the antenna in abscissas) of sum beam Σ and of difference beam Δ' in the elevation plane, for a pointing direction in the order of 0° in the elevation plane. There clearly appears from these diagrams that sum beam Σ exhibits an intensity maximum in the pointing direction of the antenna, and that difference beam Δ' exhibits a minimum intensity in the pointing direction and two maximum intensity values located on either side of the pointing direction. The diagrams of FIGS. 5C and 5D respectively show the radiation diagrams of sum beam Σ and of difference beam Δ' in the elevation plane, for a pointing direction in the order of −20° in the elevation plane. Here again, there appears that sum beam Σ exhibits a maximum intensity in the pointing direction of the antenna, and that difference beam Δ' exhibits a minimum intensity in the pointing direction and two maximum intensity values located on either side of the pointing direction. Each of FIGS. 5A and 5C shows, as an illustration, in the upper right corner of the drawing, the phase shifts applied to the different elementary cells of the transmit array of the antenna to obtain the desired beams. In this example, a square transmit array of 20×20 elementary cells has been considered. The light boxes correspond to cells set to generate a 180° phase shift, and the dark boxes correspond to cells set to generate a 0° phase shift.

Specific embodiments have been described. Various alterations, modifications, and improvements will occur to those skilled in the art. In particular, the described embodiments are not limited to the examples of numerical values mentioned in the present description.

Further, although the antenna described in relation with FIGS. 3A, 3B, and 4 is particularly adapted to the use of a monopulse radar system, it may be used for other applications. As an example, a radar system with a sequential beam switching may be implemented by means of such an

What is claimed is:

1. An antenna comprising:
    an array of individually-controllable elementary cells, each cell having two opposite antenna surfaces and being capable of wirelessly receiving an electromagnetic radiation on one of its two antenna surfaces and of wirelessly retransmitting this radiation from the other of its two antenna surfaces with a controllable phase shift ($\phi$) selected from among at least two discrete phase-shift values;
    on the side of a first surface of the array, first (S1), second (S2), third (S3), and fourth (S4) primary sources capable of respectively irradiating first, second, third, and fourth consecutive quadrants of the array; and
    a processing circuit capable of supplying a first signal (S$\Sigma$) representative of the sum of the signals S1, S2, S3, and S4 supplied, respectively, by the first (S1), second (S2), third (S3), and fourth (S4) sources, a second output signal (S$\Delta$) representative of difference S1+S2−S3−S4, and a third output signal (S$\Delta'$) representative of difference S1−S2−S3+S4,
    wherein, in the plane of the first surface of the array diameter of a beam generated by each of the sources (S1, S2, S3, S4) is equal, to within 10%, to the largest dimension of the array quadrant associated with the source.

2. The antenna of claim 1, wherein each source (S1, S2, S3, S4) exhibits a central axis orthogonal to the mean plane of the array and running through the center of the array quadrant associated with the source.

3. The antenna of claim 1, wherein the elementary cells of the array are arranged in a matrix of rows and columns.

4. The antenna of claim 3, wherein the matrix of elementary cells of the array is a square matrix.

5. The antenna of claim 1, wherein the array comprises from 100 to 10,000 elementary cells.

6. The antenna of claim 1, wherein each of the first (S1), second (S2), third (S3), and fourth (S4) primary sources comprises a horn antenna.

7. The antenna of claim 1, wherein each of the elementary cells is a 1-bit cell capable of introducing a 0 or 180° phase shift in the transmitted signal.

8. A monopulse radar system comprising the antenna of claim 1.

9. An antenna comprising:
    an array of individually-controllable elementary cells, each cell having two opposite antenna surfaces and being capable of wirelessly receiving an electromagnetic radiation on one of its two antenna surfaces and of wirelessly retransmitting this radiation from the other of its two antenna surfaces with a controllable phase shift ($\phi$) selected from among at least two discrete phase-shift values;
    on the side of a first surface of the array, first (S1), second (S2), third (S3), and fourth (S4) primary sources capable of respectively irradiating first, second, third, and fourth consecutive quadrants of the array; and
    a processing circuit capable of supplying a first signal (S$\Sigma$) representative of the sum of the signals S1, S2, S3, and S4 supplied, respectively, by the first (S1), second (S2), third (S3), and fourth (S4) sources, a second output signal (S$\Delta$) representative of difference S1+S2−S3−S4, and a third output signal (S$\Delta'$) representative of difference S1−S2−S3+S4,
    wherein the processing circuit comprises first, second, third, and fourth 180° hybrid couplers, each coupler comprising first (v1), second (v2), third (v3), and fourth (v4) input/output paths,
    and wherein the first coupler has its second (v2) and third (v3) paths respectively connected to the second (S2) and first (S1) sources, and the second coupler has its second (v2) and third (v3) paths respectively connected to the third (S3) and fourth (S4) sources;
    the third coupler has its second (v2) and third (v3) paths respectively connected to the first path (v1) of the first coupler and to the first path (v1) of the second coupler,
    the fourth coupler has its second (v2) and third (v3) paths respectively connected to the fourth path (v4) of the first coupler and to the fourth path (v4) of the second coupler; and
    the first path (v1) of the third coupler is connected to a path for supplying the first output signal (S$\Sigma$), the fourth path (v4) of the third coupler is connected to a path for supplying the third output signal (S$\Delta'$), and the first path (v1) of the fourth coupler is connected to a path for supplying the second output signal (S$\Delta$).

10. An antenna comprising:
    an array of individually-controllable elementary cells, each cell having two opposite antenna surfaces and being capable of wirelessly receiving an electromagnetic radiation on one of its two antenna surfaces and of wirelessly retransmitting this radiation from the other of its two antenna surfaces with a controllable phase shift ($\phi$) selected from among at least two discrete phase-shift values;
    on the side of a first surface of the array, first (S1), second (S2), third (S3), and fourth (S4) primary sources capable of respectively irradiating first, second, third, and fourth consecutive quadrants of the array; and
    a processing circuit capable of supplying a first signal (S$\Sigma$) representative of the sum of the signals S1, S2, S3, and S4 supplied, respectively, by the first (S1), second (S2), third (S3), and fourth (S4) sources, a second output signal (S$\Delta$) representative of difference S1+S2−S3−S4, and a third output signal (S$\Delta'$) representative of difference S1−S2−S3+S4,
    wherein the processing circuit comprises first, second, third, and fourth 180° hybrid couplers, each coupler comprising first (v1), second (v2), third (v3), and fourth (v4) input/output paths,
    and wherein each of the first, second, third, and fourth couplers is capable of:
        dividing a signal input on its first path (v1) into two signals of substantially equal intensities transmitted, with no phase change, to its second (v2) and third (v3) paths;
        adding signals received on its second (v2) and third (v3) paths and transmitting the resulting signal on its first path (v1); and
        subtracting signals received on its second (v2) and third (v3) paths and transmitting the resulting signal on its fourth path (v4).

11. A monopulse radar system comprising the antenna of claim 9.

12. A monopulse radar system comprising the antenna of claim 10.

* * * * *